Sept. 15, 1925.          1,553,780
R. W. KEELER
STARTING DEVICE FOR MOTOR ROLLERS
Filed Nov. 22, 1924    2 Sheets-Sheet 2
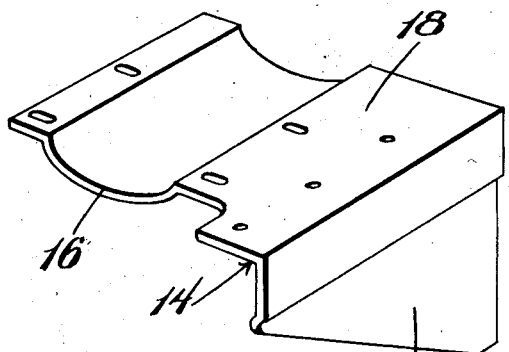
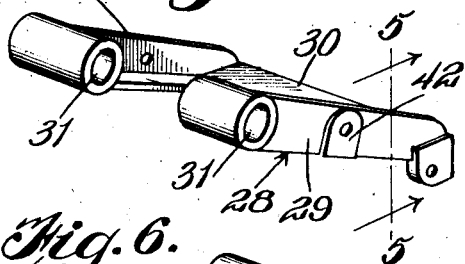
Inventor
Raymond W. Keeler Patented Sept. 15, 1925.

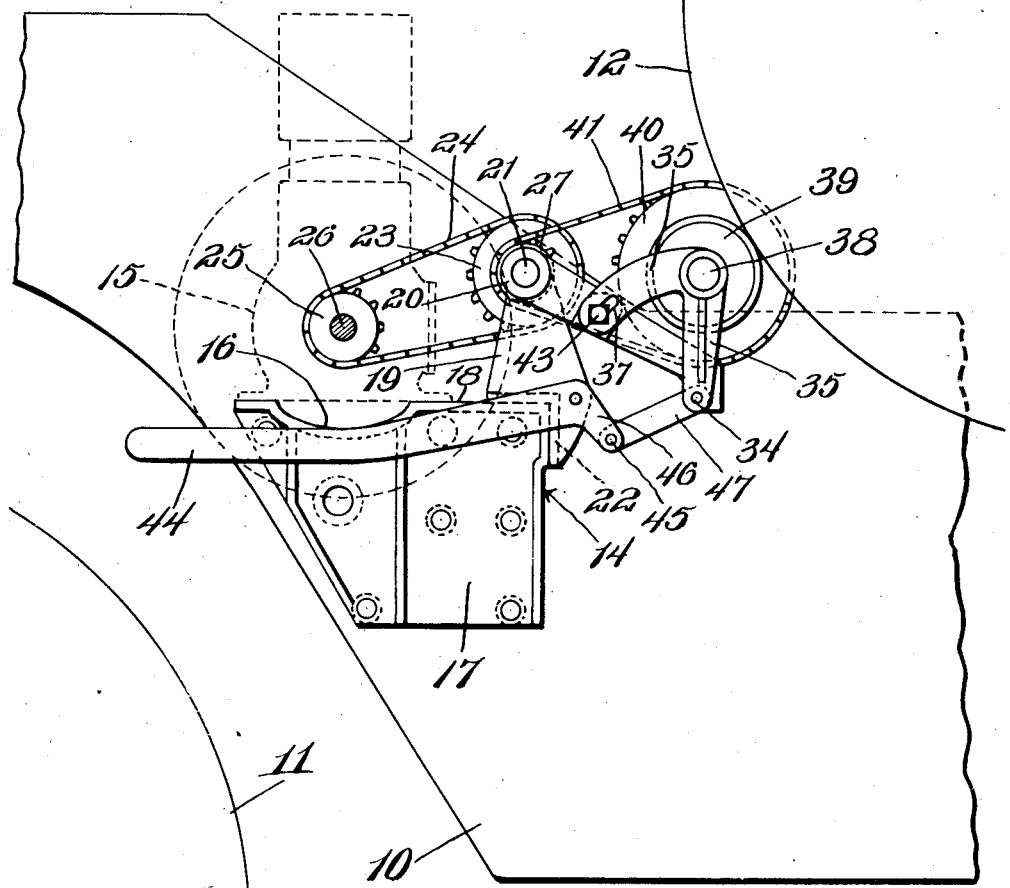

1,553,780

UNITED STATES PATENT OFFICE.

RAYMOND W. KEELER, OF GALION, OHIO, ASSIGNOR TO THE GALION IRON WORKS & MFG. CO., OF GALION, OHIO, A CORPORATION OF OHIO.

STARTING DEVICE FOR MOTOR ROLLERS.

Application filed November 22, 1924. Serial No. 751,650.

*To all whom it may concern:*

Be it known that I, RAYMOND W. KEELER, a citizen of the United States, residing at Galion, in the county of Crawford and State of Ohio, have invented certain new and useful Improvements in Starting Devices for Motor Rollers, of which the following is a specification.

This invention relates to starting devices, and particularly to means for starting large motor rollers.

Motor rollers such as are used in rolling roads and other work of like character, which rollers are relatively heavy, weighing often in the neighborhood of ten tons, are extremely difficult to start, these rollers being driven by internal combustion engines, and the object of my invention is to provide a very simple mechanism which may be applied as an attachment to the motor operated roller and which is so constructed that it may be readily applied to the fly wheel of the motor to rotate the latter and thereby start the main engine.

A further object is to provide a device of this character including an auxiliary gasoline internal combustion engine, and provide means whereby the power of this engine may be applied to the fly wheel of the main engine to drive the same.

A still further object is to provide a device of this character including a friction roller with means for gearing up the friction roller to the auxiliary engine, and means for shifting this friction roller into or out of engagement with the main fly wheel of the main engine.

Other objects will appear in the course of the following description.

My invention is illustrated in the accompanying drawings, wherein:—

Figure 1 is a fragmentary side elevation of a portion of a roller tractor showing my invention applied thereto;

Figure 2 is a perspective view of the base upon which the auxiliary engine is supported;

Figure 3 is a perspective view of the supporting bracket;

Figure 4 is a perspective view of the friction wheel supporting arms;

Figure 5 is a transverse section on the line 5—5 of Figure 4;

Figure 6 is a perspective view of the belt tightener and roller support;

Figure 7 is a diametrical sectional view through the sprocket wheel, the roller and the pawl;

Figure 8 is a section on the line 8—8 of Figure 7;

Referring to these drawings, it will be seen that I have illustrated so much of a roller tractor as is necessary to an understanding of my invention and that 10 designates part of the frame of the roller tractor, 11 designating the roller, and 12 the fly wheel of the tractor which is upon the shaft 13 and operated in any suitable manner from the main engine or motor of the tractor, it being understood that this engine or motor is an internal combustion engine.

Bolted or otherwise attached to the frame 10 upon the same side of the machine as the fly wheel is a bracket, designated generally 14, providing a base for the crank case 15 of the auxiliary or starting engine, the base being formed with a concave, transversely extending depression 16 over which the crank case is disposed, the crank case being bolted to the side walls of this portion 16. The part 16 is supported by the upstanding bracket 17 cast in one piece with the supporting member 14. The supporting member 14 is also extended so as to form a table 18, and mounted upon this table is a bracket 19 which at its upper end is formed to provide the spaced bearings 20 for the first countershaft 21. This bracket 19 is angled at its base so as to fit over the corner of the base 14 and be bolted thereto. This bracket 19 is also formed with the end flange 22, this flange being the outside flange of the bracket.

Mounted within the bearings 20 is the countershaft 21, as before stated, and mounted upon this countershaft to rotate therewith is the sprocket wheel 23 which is engaged by a sprocket chain 24 which passes over a sprocket wheel 25 mounted upon the shaft 26 of the auxiliary engine. The sprocket wheel 23 is, of course, fast upon the shaft 21 and also carries upon it a sprocket wheel 27 of smaller diameter than the sprocket wheel 23. Mounted upon the shaft 21 is a fulcrum yoke, designated generally 28, consisting of the two arms 29 and the cross bar 30, these two arms of the cross bar being integral, and the arms 29 terminate at their inner ends in eyes 31 through which the shaft 21 passes. The free end of the yoke is angular in cross section, as shown in Figure 5, and the opposite ends of the bar 30 have downwardly and inwardly extending webs 32 which are apertured. Intermediate webs 33 are also provided which are apertured for the passage of a transverse pin 34, Figure 1. Mounted upon this pin 34 are two supporting arms 35. Each of these arms 35 has an angular extension 36 which is formed with an arcuate slot 37.

The upper end of each arm 35 is formed with a bearing for a shaft 38, and mounted upon this shaft 38 is a roller 39 and a sprocket wheel 40, this sprocket wheel having a sprocket chain 41 which engages with the sprocket wheel 27. The sprocket wheel 40 is mounted upon the shaft 38 which rotates in the bearings formed in the upper ends of the arms 35. The roller 39, however, is loose upon this shaft. Each of the arms 36 is slotted at 37, as before stated, and each of the fulcrum arms 29 is formed with a boss 42 and projecting from this boss is a set screw or bolt 43 which extends into the slot 37. Mounted upon the end flange of the bracket 19 is a lever 44 which is pivoted at 45 upon this bracket and has an extension 46 pivotally connected to a link 47, in turn connected to the pin 34.

It will be obvious now that as the lever is depressed, the link 47 will act to shift the arms 29 so as to carry the friction roller 39 up into contact with the fly wheel 12 of the main engine and that the friction will cause the rotation of this fly wheel, the roller being of relatively small diameter in comparison with the diameter of the fly wheel, which is ordinarily about fifty inches.

It will be seen that the provision of the slot 37 with the set screw 43 or bolt permits the arms 35 to be turned inward, that is away from the main fly wheel or outward toward the main fly wheel so as to take up any slack in the chain 41, which may be from time to time necessary, and to compensate for any wearing down of the face of the roller 39. After the roller has been properly adjusted, the set screw is turned to bind the arms 36 in their adjusted position. When this has been done it is obvious that the lifting of the lever 44 will cause the retraction of the roller from its engagement with the periphery of the fly wheel, and a depression of the lever will cause the roller to be forced up into engagement with the fly wheel. This roller, as illustrated in Figure 7, is preferably covered with felt and compressed brake band lining or other material of like nature.

As illustrated in Figure 7, the pulley at one point is formed with an aperture through which there is disposed a pin 39ᵃ having attached thereto or formed therewith the pawl 48. This pawl 48 extends tangentially outward from the friction drive pulley 39. The second countershaft sprocket wheel 40 has an outwardly projecting flange, the inner face of which is formed with ratchet teeth 49, and the pawl 48 is adapted to engage these ratchet teeth. This pawl 48, of course, extends rearward and the teeth face forward so that as the sprocket wheel 40 rotates in one direction the pawl will be carried around and will give corresponding rotation to the roller 39. As soon, however, as the engine is started, the roller will proceed to run faster than the sprocket wheel 40 and the pawl 48 will ride over the teeth 49. As soon as this has been accomplished and the engine is started, the lever 44 is shifted so as to carry the roller 39 out of its engagement with the fly wheel and, of course, the starting or auxiliary engine is stopped.

The operation of my mechanism will be obvious from what has gone before. Whenever it is desired to start the main engine, the auxiliary engine is started up and this, through the operation of the several sprocket wheels and chains, drives the shaft 38, which drives the roller 39, thus driving the fly wheel. When the fly wheel overruns, operative disconnection will be made between the roller 39 and the sprocket wheel 40. From time to time the shaft 38 may be adjusted nearer to or further from the shaft 21 to thus take up any slackness in the chain or make up for any wear on the roller. This device has been found particularly effective in starting the large roller tractors, doing entirely away with the necessity of any hand starting.

While I have illustrated certain details of construction and arrangement of parts which I believe to be effective, I do not wish to be limited to this as it is obvious that many changes might be made in these details without departing from the spirit of the invention as defined in the appended claims.

I claim:—

1. The combination with a tractor having an internal combustion engine and a fly wheel operatively connected therewith, of means for starting the tractor including an auxiliary engine rigidly mounted upon the tractor, a friction roller mounted for movement relative to the engine into or out of engagement with the fly wheel, and means for driving the friction roller from the auxiliary engine in all positions of the friction roller.

2. The combination with a vehicle having an internal combustion engine and a wheel operatively connected thereto, of a starting mechanism therefor including a motor, and a friction wheel driven thereby and having means whereby it may be shifted into or out of engagement with the first named wheel, the friction wheel being so connected to the motor that it may revolve at a faster speed than the motor.

3. The combination with a tractor having an internal combustion engine as a driving means and a fly wheel operatively connected thereto, of a starting mechanism therefor including a motor, and a friction wheel driven thereby and having means whereby it may be manually shifted into or out of engagement with the fly wheel, the friction wheel being so connected to the second named motor that it may revolve at a faster speed than the motor.

4. The combination with a tractor having an internal combustion engine and a fly wheel operatively connected thereto and driven thereby, of a starting mechanism therefor including an auxiliary motor rigidly mounted upon the tractor, a countershaft mounted for movement independent of the motor toward or from the fly wheel and carrying a friction roller adapted to engage with the periphery of the fly wheel, a driving connection between the auxiliary motor and the countershaft operative in all positions of the countershaft, and manually operable means for shifting the countershaft toward or from the periphery of the fly wheel.

5. The combination with a tractor having an internal combustion engine and a fly wheel operatively connected thereto and driven thereby, of a starting mechanism therefor including an auxiliary internal combustion engine mounted upon the frame of the tractor, an arm pivotally supported at one end, a countershaft carried by said arm and carrying thereon a friction roller adapted to engage the periphery of the fly wheel, a driving wheel, the driving wheel being operatively connected to the auxiliary engine and there being means permitting the roller to run faster than the driving wheel, and manually operable means for shifting said arm to shift the friction roller into or out of engagement with the fly wheel.

6. The combination with a vehicle having an internal combustion engine and a fly wheel operatively connected thereto and driven thereby, of a starting mechanism therefor including an auxiliary internal combustion engine operatively supported upon the frame of the tractor, a countershaft driven from the engine and carrying a sprocket wheel, a second countershaft, arms pivotally engaged with the first named countershaft and supporting the second named countershaft, a sprocket wheel mounted upon the second named countershaft and operatively engaged with the first named sprocket wheel, a roller loosely mounted upon the second countershaft, means operatively engaging the second sprocket wheel with the roller but permitting the roller to rotate faster than the second named sprocket wheel, a lever, and operative connections between said lever and said arm whereby the arm may be shifted to carry the friction roller into engagement with the periphery of the fly wheel or lowered to carry the friction roller out of such engagement.

7. The combination with a tractor having an internal combustion engine and a fly wheel operatively connected thereto and driven thereby, of an auxiliary internal combustion engine mounted upon the frame of the tractor, a countershaft, a sprocket wheel thereon driven from the shaft of the auxiliary engine, arms pivoted upon the countershaft, members supported upon the extremities of said arms, a second countershaft mounted upon said members, a friction roller carried upon the second countershaft, a sprocket wheel mounted upon the second countershaft and operatively engaged with the first named countershaft, the second named sprocket wheel and the friction roller having operative engagement with each other causing the rotation of the friction roller with the sprocket wheel but permitting the friction roller to run faster than the sprocket wheel, and manually operable means for raising or lowering the free ends of said arms to carry the roller into or out of engagement with the fly wheel.

8. The combination with a tractor having an internal combustion engine and a fly wheel operatively connected thereto and driven thereby, of an auxiliary internal combustion engine mounted upon the frame of the tractor, a countershaft, a sprocket wheel thereon driven from the shaft of the auxiliary engine, arms pivoted upon the countershaft, members supported upon the extremities of said arms and operatively connected at their free ends, chain tightening members pivotally mounted upon the extremities of said arms and adjustable toward or away from the first named countershaft, a second countershaft mounted upon said chain tightening members, a sprocket wheel mounted thereon and operatively engaged with the sprocket wheel upon the first named shaft, a friction roller carried upon the second named shaft and engageable with the fly wheel, means for transmitting motion from the second named sprocket wheel to the friction wheel but permitting the friction wheel to run faster than the sprocket wheel, and a lever operatively connected to the free ends of the arms and shiftable to shift the arms to carry the friction roller into or out of engagement with the fly wheel.

9. The combination with a tractor having an internal combustion engine and a fly wheel operatively connected thereto and driven thereby, of an auxiliary internal combustion engine mounted upon the frame of the tractor, a countershaft, a sprocket wheel thereon driven from the shaft of the auxiliary engine, arms pivoted upon the countershaft, members supported upon the extremities of said arms and operatively connected at their free ends, chain tightening members pivotally mounted upon the extremities of said arms and adjustable toward or away from the first named countershaft, a second countershaft mounted upon said chain tightening members, a sprocket wheel mounted thereon and operatively engaged with the sprocket wheel upon the first named shaft, a friction roller carried upon the second named shaft and engageable with the fly wheel, and means for transmitting motion from the second named sprocket wheel to the friction wheel including a driving wheel disposed on the same axis as the friction wheel, one of said wheels being formed with inwardly extending ratchet teeth and the other having a pawl engaging said ratchet teeth, said means permitting the friction wheel to turn in one direction faster than the driving wheel.

10. The combination with a tractor having an internal combustion engine and a fly wheel operatively connected thereto and driven thereby, of an auxiliary internal combustion engine mounted upon the frame of the tractor, a countershaft, a sprocket wheel thereon driven from the shaft of the auxiliary engine, arms pivoted upon the countershaft, members supported upon the extremities of said arms, and operatively connected at their free ends, chain tightening members pivotally mounted upon the extremities of said arms and adjustable toward or away from the first named countershaft, a second countershaft mounted upon said chain tightening members, a sprocket wheel mounted thereon and operatively engaged with the sprocket wheel upon the first named shaft, a friction roller carried upon the second named shaft and engageable with the fly wheel, and means for transmitting motion from the second named sprocket wheel to the friction wheel including a sprocket wheel mounted upon the same axis as the driving wheel but rotatable independently thereof, the sprocket wheel having an internal ratchet gear and the friction wheel carrying a pawl engageable with said ratchet wheel, said pawl and ratchet wheel permitting the friction wheel to rotate faster than the sprocket wheel.

In testimony whereof I affix my signature.

RAYMOND W. KEELER.